No. 742,446. PATENTED OCT. 27, 1903.
H. P. KELLY.
DENTAL FILLING TOOL.
APPLICATION FILED FEB. 5, 1903.
NO MODEL.
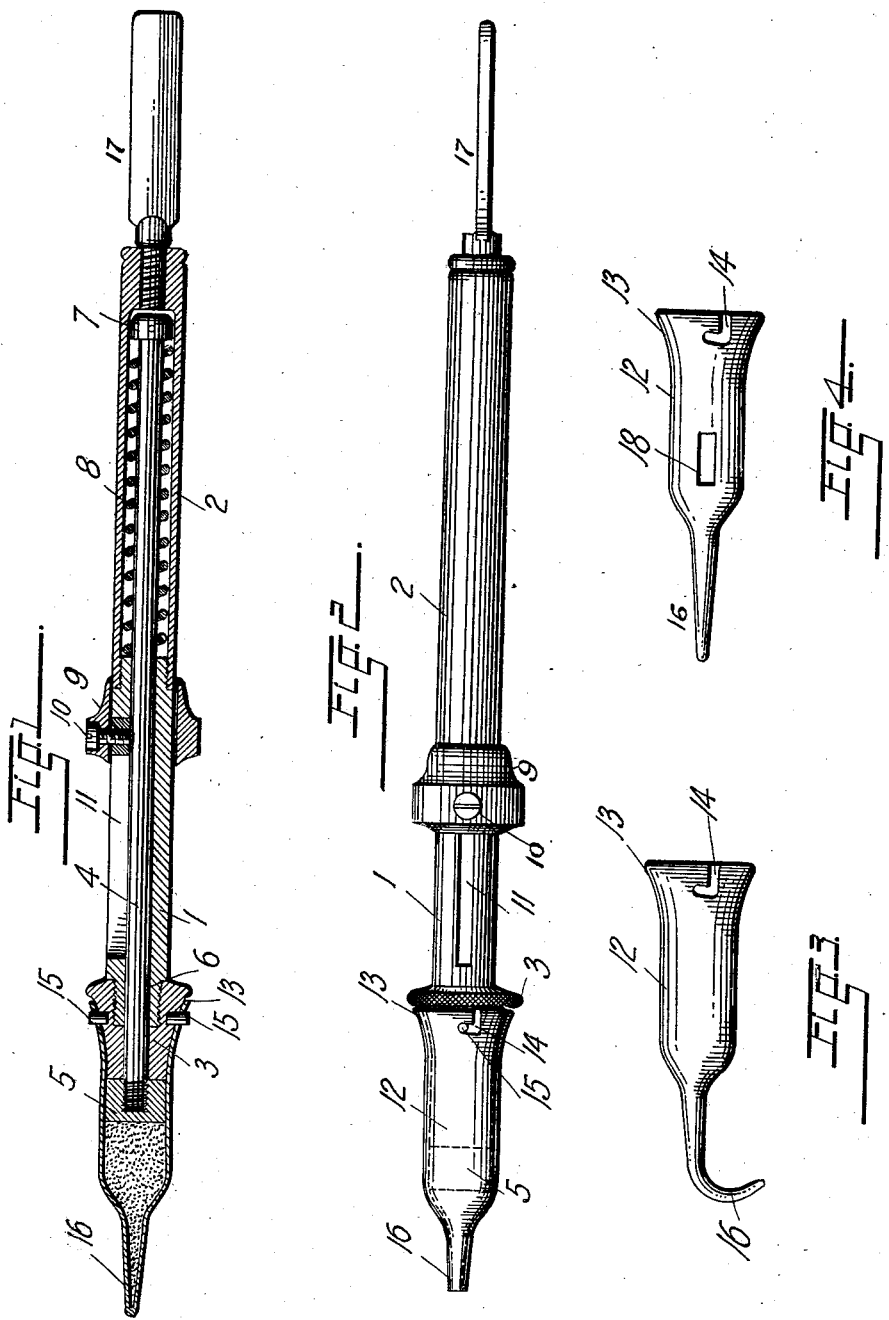
Witnesses:
Inventor:
Harry P Kelly
by Johnson & Johnson
Attorneys.

No. 742,446.

Patented October 27, 1903.

UNITED STATES PATENT OFFICE.

HARRY P. KELLY, OF DENVER, COLORADO.

DENTAL FILLING-TOOL.

SPECIFICATION forming part of Letters Patent No. 742,446, dated October 27, 1903.

Application filed February 5, 1903. Serial No. 141,961. (No model.)

*To all whom it may concern:*

Be it known that I, HARRY P. KELLY, a citizen of the United States, residing in the city and county of Denver and State of Colorado, have invented certain new and useful Improvements in Dental Filling-Tools, of which the following is a specification.

My invention relates to improvements in dental syringes, and has for its object to provide a syringe having a tube or barrel adapted to carry cement or other filling material or medicaments to the tooth-cavity or other diseased part and which is easily attached and detached and which is composed of such cheap material that it may be used once and then thrown away.

My said invention consists in a handle member having a plunger at one end and a barrel member which is adapted to be secured upon the end of the handle, so as to receive within its hollow the thrust of the plunger.

In filling teeth or otherwise treating them a syringe is a most desirable tool for holding and conveying the filling materials or medicaments in liquid or plastic form from the mixing vessel to the tooth-cavity. In filling a tooth-cavity with cement, for instance, the operator first prepares the tooth-cavity and then mixes the cement. Since this cement "sets" very quickly, it must be conveyed at once to the tooth and there spread and properly distributed throughout the cavity. The operator has no time to spend in cleaning the syringe, and so the syringes now in general use are laid aside to be cleaned at some idle moment and another used to carry the next charge. To avoid these obvious objections, I construct the syringe-barrel, which is the only part that gets clogged by the rapidly-setting cement, of some cheap material and so that it can be quickly attached and detached from the handle and plunger and used once and then thrown away.

In the accompanying drawings, which form a part of this specification, Figure 1 is a central longitudinal section of my syringe. Fig. 2 is a view showing the manner of securing the barrel or pipette upon the handle. Fig. 3 shows a form of barrel or pipette having a bent spout. Fig. 4 is a modification of the barrel or pipette, showing the side opening for filling the same after it has been attached to the handle member.

The handle of the syringe consists of the centrally-bored stem-piece 1, having a hollow casing 2, screwed upon and extending from one end, and a socket-head 3 at its other end. A piston-rod 4, having the plunger 5 on its outer end, passes through the central guide-bore 6 of the stem and into the hollow casing 2 and has on its inner end a cap 7. A spiral spring 8 in the hollow casing is interposed between the piston-cap 7 and the inner end of the stem-piece and tends to hold and retract the piston and plunger to the position shown in Fig. 1. A sliding collar 9 encircles the stem-piece and has a screw-pin 10, which penetrates a slot 11 in the stem and screws into the piston-rod 4 and securely fastens the collar to the piston-rod, so that upon pushing the sliding collar along the stem the piston-plunger will be projected for a purpose presently explained. The socket-head 3 on the end of the handle is preferably conical and truncated. The plunger 5 of the piston is cylindrical and when retracted abuts tightly against the truncated end of the head 3, the diameter of the plunger being the same as that of the truncated end of the head. The syringe-barrel 12 (herein also called the "pipette") is flared at its open end 13, and the flared portion fits tightly upon the conical end of the head and is secured thereon by a bayonet-joint formed by the angular slot 14 in the end of the barrel or pipette and a pin or pins 15 on the socket-head. The flared portion of the barrel or pipette is only that portion which covers the conical head, the rest of the pipette being cylindrical, so as to permit of the thrust therein of the cylindrical plunger 5. The other end of the barrel-pipette is tapered to form a hollow spout 16, which may be straight, as in Fig. 1, or it may be bent, as shown in Fig. 3, so as to more readily reach a cavity in the back or side of a tooth. The pipettes are made without any discharge-opening in their hollow spout end, and it is intended that the operator shall cut off the end of the tapered spout at such a point as to form an opening therein of such dimensions as the particular operation requires—that is to say, if it is desired to discharge only a small quantity of the contents or if it be that the opening of the tooth-cavity be very small the operator would only cut off the very tip of the tapered spout. If it be desired to discharge the contents of the syringe quickly into a large cavity-opening, the tapered end of the barrel-pipette will be cut off farther back from the tip. This means of varying the discharge-opening is also used to suit the differences in the nature of the contents of the syringe.

In using my new syringe for filling cement or medicaments into a tooth-cavity the operator mixes his charge of cement, &c., using for this purpose the spatula 17 on the end of the handle, and puts the mixture into one of the pipettes or syringe-barrels. He then places the open end of the pipette over the socket-head of the stem, so that the pin on the side of the socket-head will enter the slot in the end of the pipette, and then by giving the pipette a slight turn securely fastens the same upon the socket-head by the bayonet-joint. He then cuts off the end of the tapered spout of the pipette, positions its point in the tooth-cavity, and pushes on the sliding collar 9 and forces the plunger down into the barrel of the pipette and expels the contents therefrom out through the spout into the tooth-cavity. The pipette is then removed from the handle and cast aside, and the handle is clean and ready for the attachment of another pipette.

In Fig. 4 I show a modified form of the pipette, which is used in exactly the same manner, except that the pipette is first attached to the handle and then the cement, &c., is put in through the opening 18 in its side.

The pipettes or barrels are made of some easily molded or pressed material—such as gelatin or celluloid or the like or of metal—and are cheap enough to be used once and then thrown away. This gives many advantages to a syringe such as I have described, among which may be mentioned the facts that my syringe is always clean and new and would not become a means of carrying the disease of one mouth to another. It is always ready for service, and if required to be cleaned the only parts which could become clogged with the cement are the socket-head and the plunger, and as these are perfectly exposed when the pipette is removed they may be very quickly scraped and cleaned.

While I have shown and described the several parts of my syringe with especial reference to its use with plastic materials, it is obvious that it is equally well adapted for use with liquids in any branch of surgery. For use with corrosive liquids the plunger may be provided with a packing or with a non-corrosive coating.

I claim—

1. In a dental syringe, a handle carrying a plunger normally retracted, in combination with a detachable barrel portion or pipette having a tapering discharge-spout normally closed and adapted to be opened by cutting off the tip of spout.

2. In a dental syringe, a handle carrying a spring-retracted cylindrical plunger exteriorly abutting a conical socket-head, a spouted cylindrical barrel flared at one end to tightly fit over the conical socket-head and means for detachably securing said spouted barrel upon said socket-head in position to receive within its hollow cylindrical portion the thrust of the cylindrical plunger, substantially as described.

3. In a dental syringe, a handle carrying exteriorly at one end a plunger, and a socket-head, in combination with a spouted barrel-pipette adapted to be secured upon the socket-head so as to receive within its hollow the thrust of said plunger and means for fastening said barrel-pipette on the socket-head of said handle, substantially as described.

4. In a dental syringe, a barrel-pipette open at one end, its other end terminating in a closed spout or nozzle for containing a liquid or plastic.

5. In combination in a dental syringe, a handle member having an end socket-head, a plunger projecting therefrom at the headed end, a spouted barrel-pipette adapted to be secured upon said socket-head so as to receive within its hollow the thrust of the plunger, means for fastening said pipette upon said socket-head, and an opening in the side of said pipette for charging the same.

6. In a dental syringe, a handle member having a central bore and an end head through which the bore extends, a hollow casing secured to and forming an extension of the other end of the handle, a rod movable in the bore of the handle, and having a plunger external of the end head, its other end terminating within the case, a barrel-pipette detachably secured upon the head, inclosing the plunger and terminating in a spout or nozzle, means for retracting the plunger and a collar slidable on the case and engaging the plunger-rod for projecting it.

In testimony whereof I affix my signature in presence of two witnesses.

HARRY P. KELLY.

Witnesses:
 A. ROLAND JOHNSON,
 HANNAH J. O'TOOLE.